United States Patent [19]

Wizemann et al.

[11] Patent Number: 4,606,883
[45] Date of Patent: Aug. 19, 1986

[54] METHOD OF MANUFACTURING A METALLIC COMPOSITE ARTICLE

[75] Inventors: Kurt Wizemann; Hans Weisskopf, both of Stuttgart; Peter Peppler, Weinstadt, all of Fed. Rep. of Germany

[73] Assignee: J. Wizemann GmbH & Co., Fed. Rep. of Germany

[21] Appl. No.: 656,493

[22] Filed: Oct. 1, 1984

[30] Foreign Application Priority Data

Oct. 21, 1983 [DE] Fed. Rep. of Germany ....... 3338298

[51] Int. Cl.$^4$ .............................................. B22F 7/00
[52] U.S. Cl. .......................................... 419/8; 419/5; 419/24; 419/42; 419/49; 419/68; 427/191; 427/350; 427/383.7; 428/549; 428/553; 428/908.8; 148/6
[58] Field of Search ...................... 419/68, 8, 9, 66, 38, 419/23, 42, 5, 49, 24; 427/191, 189, 133, 216, 217, 350, 383.7; 428/908.8, 549, 553; 148/6

[56] References Cited

U.S. PATENT DOCUMENTS

| 4,065,302 | 12/1977 | Turillon | 419/8 |
| 4,104,787 | 8/1978 | Jandeska et al. | 419/8 |
| 4,477,955 | 10/1984 | Becker et al. | 419/8 |
| 4,526,747 | 7/1985 | Schimmel et al. | 419/8 |

FOREIGN PATENT DOCUMENTS 1921568 12/1978 Fed. Rep. of Germany.
2833840 2/1980 Fed. Rep. of Germany.

*Primary Examiner*—Stephen J. Lechert, Jr.

[57] ABSTRACT

Method of manufacturing a metallic composite article, with which the surface area of a base member, which surface area consists of a metallic base material, is bonded to a plating material over the entire surface. The base member is to be plated with a layer which is as far as possible homogeneous and thin and the composition of which is freely selectable. For this purpose, the plating material is placed in a sheet-metal cap which is adapted to the surface area to be plated as well as to the adjacent area of the base member surrounding this surface area and overlaps this adjacent area. Once the plating material and sheet-metal cap have been pressed against the base member the sheet-metal cap is evacuated and welded by electron beam, under vacuum, to the base member, whereupon base member, plating material and sheet-metal cap are hot-isostatically pressed. The sheet-metal cap is then removed, leaving the desired, plated base member.

15 Claims, 4 Drawing Figures

METHOD OF MANUFACTURING A METALLIC COMPOSITE ARTICLE

The invention relates to a method of manufacturing a metallic composite article comprising a surface area consisting of a metallic base material which is bonded over the entire surface with a plating material forming a layer member.

Conventional methods of plating workpieces are soldering, deposition welding, thermal flame or plasma spraying, detonation plating, vapor deposition (PVD=physical vapor deposition and CVD=chemical vapor deposition) as well as electrochemical plating, e.g. by electrodeposition. Each of these known methods has varying limitations regarding the plating materials which may be used, the thickness of the plating and the density of the layer member formed by the plating material. Furthermore, not all these methods result in a homogeneous layer member and a perfect bond of the latter to a base member of the composite article. If forces are introduced into a base member via a plated surface, either by dynamic or frictional stressing, the homogeneity of the plating, e.g. uniform distribution of the carbides, the density, i.e. lack of pores, and the perfection of the bond between the layer member formed by the plating material and the base member of the composite article are of paramount importance.

For the reasons explained above, methods such as deposition welding or thermal spraying are limited in their usefulness when layers having a thickness in the millimeter range (equal to or greater than 0.5 mm, are to be plated onto a base member. On the other hand, soldering is extremely difficult and complicated when solid plates which are several square centimeters in size are to be applied without measurable bonding flaws (individual flaws may cover, at the most, an area of 0.5 $mm^2$). Soldering also makes it necessary to have plates geometrically adapted to the surface area to be plated such that the tolerances are very narrow. This proves to be extremely disadvantageous, at least for sintered plates as they are difficult to work.

It is already known, when metal-cladding a surface area of a workpiece, to place the workpiece in a dish-shaped mold which is open at the top such that the surface area to be metal-clad is located within the mold and to secure the mold to the workpiece by welding (German patent specification No. 19 21 568). A hard-metal alloy is then added to the mold in powder form and sintered under vacuum. The mold therefore serves the exclusive purpose of shaping the hard metal alloy. The hard metal alloy is not compressed by sintering under vacuum, gas occlusions cannot be avoided and, finally, the quality of the bond between workpiece and metal-cladding leaves much to be desired. The same applies for another known method of coating workpieces with hard metal alloys (German Offenlegungsschrift No. 28 33 840), with which a dish-like mold open at the top is also used. The workpiece is placed in this mold and the hard metal alloy, which is present in powder form, is melted under overpressure and so gas occlusions in the hard metal alloy can certainly not be avoided.

The object of the invention was to specify a method for producing a metallic composite article which has a base member with a metallic surface area which is bonded over the entire surface with a layer member consisting of a plating material and being at least essentially free of pores.

Proceeding on the basis of a method for manufacturing a metallic composite article, with which a surface area of a base member, this surface area consisting of a metallic base material, is coated with a plating material forming a layer member and with which the plating material is arranged in a mold adapted to the surface area and welded to an adjacent area of the base member surrounding the surface area and then compacted in a vacuum by applying heat, whereupon the mold is removed, the object may be accomplished according to the invention in that the mold is a sheet-metal cap forming with the base member a cavity for receiving the plating material which is closed on all sides, the sheet-metal cap is pressed with the plating material against the base member, the hollow cavity evacuated and the sheet-metal cap simultaneously welded to the adjacent area of the base member by electron beam or laser, under vacuum, so as to be gastight and the cavity is thus closed so as to be gastight, whereupon base member, plating material and sheet-metal cap are hot-isostatically pressed at a suitable pressure and temperature and for a suitable time while maintaining the vacuum under the sheet-metal cap. The inventive method is used either for subsequent compacting of a layer member previously applied to the base member by, for example, deposition welding or thermal flame or plasma spraying, whereby the bond between the base and layer members is improved, or it is used such that the plating material is first placed in the sheet-metal cap and the base member then inserted in order to convert the plating material, by the inventive method, to an almost pore-free layer member and simultaneously bond it to the base member over the entire surface. In any case, the plating material is subjected, according to the invention, to vacuum, pressure and temperature at the same time. The hot-isostatic pressing brings about a highly compact plating material and a good bond between the plating material and the base member over the entire surface. Closure of the cavity which is formed between the sheet-metal cap and the base member and receives the plating material under vacuum conditions results in the plating material also being under vacuum during hot-isostatic pressing. This will avoid gas pockets in the plating and a particularly pore-free plating is thereby achieved. Finally, the inventive method may be performed extremely economically since welding by electron beam or laser must, in any case, be carried out in a vacuum. Therefore, the evacuation of the hollow cavity enclosed by the sheet-metal cap and the base member and receiving the plating material does not require any additional method step. The inventive method also allows the plating material to be selected to a large degree without restriction and the base member to be plated with a layer member, the thickness of which is very slight and in the millimeter range. This is not possible with the conventional plating methods described at the outset.

The so-called hot-isostatic pressing is a known method, with which the article to be treated is inserted into a pressure tank having a heating element, which is heated, in particular, by electricity and which surrounds the article to be treated. Once the pressure tank has been flushed with nitrogen and subsequently filled with argon or another inert gas, the closed pressure tank is heated by means of the heating element. The pressure and temperature used during treatment may be freely determined within broad limits by adjusting the pressure of the inert gas filling prior to heating and by regulating the heating temperature. At a temperature of, for example, 1200° C. the sheet-metal cap does not remain rigid in its form and so the plating material and the base member are firmly pressed together and a reliable and flawless bond can be produced.

Not only does the inventive method reliably accomplish the object set but it also has numerous advantages, particularly when, as with the preferred embodiment of the inventive method, the plating material is placed in the sheet-metal cap as a powdery mixture of the individual material components. There is a great deal of freedom not only in selecting the material composition of the plating material but also with respect to the grain size and thickness of the layer member and so the layer member can be optimally adjusted to the respective tribological requirements of the surface area of the base member to be plated. In addition, the base of the sheet-metal cap need not be plane but can have any optional shape. The sheet-metal cap, together with the base member, also offers protection against undesired changes in the plating material during heat treatment of the base member after plating, i.e. when the base member is, for example, to be casehardened or nitrided.

Particular advantages over the prior art are offered for workpieces subject to surface stress which is force-dependent, i.e. above all for surfaces stressed by friction and abrasion. The homogeneity and pore-free state of the plated layer as well as the grain size and structure in the texture of the plating material are of particular significance with regard to signs of fatique during sliding, rolling or a combined slide-rolling stressing. The inventive method is therefore of particular importance when used in the fields of component parts for gas-change control in internal combustion engines, such as cams and their followers, such as valve tappets, rocker arms, valve rockers or drag levers, metal-clad valve discs and the like and also for deforming tools, such as extrusion molding dies and drawing dies, guide rails and templets, cutting edges, thread guides and deflecting rollers. Since, as already mentioned, the base of the sheet-metal cap need not be plane, the inventive method can also be applied in the fields of turbine blades, projectiles etc.

With regard to the sheet-metal cap being secured to the base member by electron beam or laser welding, it may be mentioned that with this type of bonding a good deal less heat is introduced into the materials than during soldering or other welding methods, that the welding seam is narrower and that troublesome vapors are not generated.

The base member may consist of steel or cast iron or also of nonferrous metals.

The invention is not anticipated by the state of the art, as proven by the fact that for many years now other ways have been used which entail great expense and have the disadvantages described even though hot-isostatic pressing has been well-known and in industrial use for at least 25 years. The precipitous technical progress is documented by the fact that, for example, a valve tappet for an internal combustion engine can be produced by means of the inventive method for less than half the price of conventional plating methods, i.e. by soldering on a wear-resistant plate.

The sheet-metal cap will never abut on the base member so as to be gastight and so special evacuation apertures are, as such, unnecessary. However, to be able to evacuate the cavity enclosed by the sheet-metal cap and, more particularly, the plating material quickly during welding of the sheet-metal cap to the base member, it is recommended that the base member be provided in the adjacent area with an evacuation groove and this groove be closed during welding under vacuum once the cavity enclosed by the sheet-metal cap and base member has been evacuated.

Although it is expedient to place the plating material in the sheet-metal cap as a powdery mixture of the individual material components, it is also possible for the plating material to be a precompacted or sintered mixture or an alloy of the individual material components which is then bonded by hot-isostatic pressing to the base member over the entire surface. The plating material can also be inserted into the sheet-metal cap as a solid layer member.

When cast iron is used as base material, it is necessary to prevent carbon diffusing into the plating material, which is placed in the sheet-metal cap in powder form, and impeding a homogeneous sintering or altering the material composition. It is therefore recommended that to control diffusion of the plating material and the base material a foil acting in particular as a diffusion barrier for carbon and preferably consisting of nickel or cobalt be inserted between base member and plating material.

Subsequent to hot-isostatic pressing and, if necessary, a later heat treatment of the workpiece, the sheet-metal cap may be removed without difficulty in that its peripheral area is filed away. If difficulties do arise when separating the cap base, these may be avoided by providing the sheet-metal cap on the inside with a layer acting as a diffusion barrier to prevent the sheet metal cap and the plating material from bonding together.

When working with powdery plating materials, the inventive method enables the plated layer to be reinforced without difficulty. For this purpose, fibrous or filamentary reinforcing elements or fleeces or webs produced therefrom are inserted into the plating material. Whiskers or carbon fibres are particularly considered as reinforcing elements.

The inventive method may be used particularly advantageously for powders consisting of materials which are difficult to cast and/or work, in particular casting materials having a high content of chromium, vanadium, wolfram and/or cobalt.

Additional advantages of the invention are given in the attached claims and/or the following description of several preferred embodiments of the inventive method.

In the attached drawings.

Figure 2:
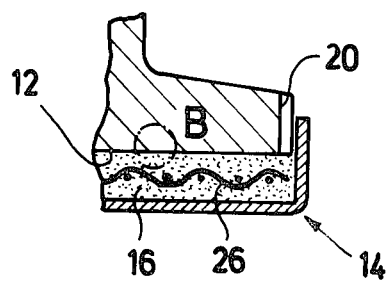
FIG. 2 shows section "A" from FIG. 1 on a larger scale.
Figure 3:
Figure 4:

FIG. 3 shows section "B" from FIG. 2 as a photographic picture of a metallographic ground surface using the known powdered hard solid G3 as plating material and subsequent to hot-isostatic pressing, and FIG. 4 is a corresponding picture using a precompacted and sintered plate of the hard metal type G 20 as plating material, the embodiments of FIGS. 3 and 4 using a base member consisting of the casehardening steel 15 Cr 3.

Figure 1:
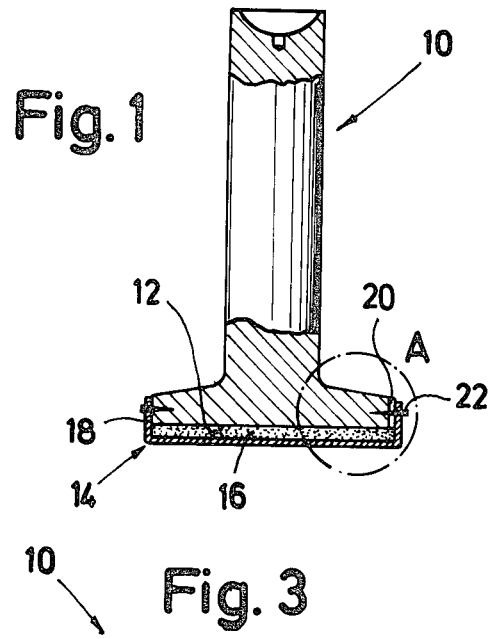
FIG. 1 shows an axial section through a valve tappet with plating material and sheet-metal cap.

FIG. 1 shows a valve tappet base member 10 having a surface area 12 to be plated, this surface area being covered by a sheet-metal cap 14 placed over the base member. Plating material 16 has been added to the sheet-metal cap and forms the layer member to be plated onto the base member. The sheet-metal cap 14 overlaps an adjacent area 18 of the surface area 12 to be plated. This adjacent area thereby forms part of the peripheral surface of the base member 10 and has, for example, an evacuation groove 20 so that the cavity enclosed by the sheet-metal cap 14, including the plating material 16 in, for example, powder form, can be evacuated before the sheet-metal cap 14 is welded to the valve tappet base member 10 under vacuum along a welding seam 22 and the evacuation groove 20 is thereby closed.

As shown in FIG. 2, a web 26 has been inserted into the powdery plating material 16. This web is, for example, manufactured from carbon fibres.

In FIGS. 3 and 4, the base member has again been designated 10 and the plating material 16.

When plating the base member 10 consisting of case-hardening steel 15 Cr 3 with the generally known powdered hard solid G 3 or with a purchasable layer member consisting of a compacted and sintered hard metal of the hard metal type G 20, the layer member consisting of the relevant plating material was, in both cases, pressed directly against the base material and bonded thereto, namely by hot-isostatic pressing at 1150° C. and 1300 bars. Impact tests disclosed an extremely good bonding strength of the layer member when plated on the base member.

With respect to the embodiments shown in FIGS. 3 and 4, a press manufactured by Autoclave International, USA, was used. The heating time was selected as 3 hours. First of all, the pressure tank of the press was flushed with nitrogen, the pressure tank evacuated, filled with argon and, finally, the argon pressure adjusted to 460 bars at room temperature before heating was commenced. With the pressure tank closed, the pressure was then 1300 bars at a temperature of 1150° C.

Hot-isostatic presses are also obtainable from the following manufacturers: ASEA, Sweden; National Forge, USA; Kobe, Japan.

As already mentioned, the layer member consisting of the plating material will, for cost reasons, normally be pressed directly against the base material of the base member and bonded thereto. If the base and plating materials do, however, have considerably varying coefficients of heat expansion, it is recommended that a foil, in particular of copper and/or nickel and their alloys or constantan, be inserted between base member and plating material to equalize these differences.

We claim:

1. A method of manufacturing a metallic composite article by coating a metallic surface area of a base member with a plating material forming a layer member, said method comprising:
arranging said plating material in a sheet-metal cap;
pressing said cap against said base member such that said plating material is held adjacent said metallic surface area to be coated in a cavity formed by the extension of said cap to areas of said base member surrounding said metallic surface area to be coated, said pressing substantially eliminating voids within the cavity;
welding the periphery of said cap to said surrounding areas of said base member, thereby closing said cavity on all sides so as to be gastight;
hot-isotatically pressing said base member, said plating material and said cap; and
removing said cap from said base member to expose said coated metallic surface area.

2. The method of claim 1 wherein the pressing step and the subsequent welding step are performed under vacuum.

3. The method of claim 2, wherein said cap is welded to said base member by laser.

4. The method of claim 2, wherein said cap is welded to said base member by electron beam.

5. Method as defined in claim 1, wherein the plating material is placed in the sheet-metal cap as a precompacted mixture of the individual material components.

6. Method as defined in claim 1, wherein the plating material is placed in the sheet-metal cap as a sintered mixture of the individual material components.

7. Method as defined in claim 1, wherein the plating material is placed in the sheet-metal cap as an alloy of the individual material components.

8. Method as defined in claim 1 wherein a foil acting in particular as a diffusion barrier and preferably consisting of cobalt is inserted between said base member and said plating material to control diffusion of said plating material and said base material.

9. Method as defined in claim 1, wherein said plating material is a casting material being in a powdery state when being put into said cap, said casting material having a high content of at least one of the materials from the group consisting of chromium, vanadium, wolfram and cobalt.

10. Method as defined in claim 1, characterized in that the base member is provided in said surrounding areas with an evacuation groove and said groove is closed during welding under vacuum once the cavity enclosed by the sheet-metal cap and base member has been evacuated.

11. Method as defined in claims 1 or 10, characterized in that the plating material is placed in the sheet-metal cap as a powdery, precompacted or sintered mixture or as an alloy of the individual material components and then bonded with the base member over the entire surface by being hot-isostatically pressed.

12. Method as defined in any or several of claims 1 to 11, characterized in that to control diffusion of the plating material and base material a foil acting in particular as a diffusion barrier and preferably consisting of nickel or cobalt is inserted between base member and plating material.

13. Method as defined in any or several of the preceding claims, characterized in that the sheet-metal cap is provided on the inside with a layer acting as a diffusion barrier.

14. Method as defined in claim 11, characterized in that fibrous or filamentary reinforcing elements or fleeces or webs produced therefrom are inserted into the powdery plating material.

15. Method as defined in any or several of the preceding claims, characterized in that the layer of plating material applied has a thickness of 0.5 to 5 mm.

* * * * *

UNITED STATES PATENT AND TRADEMARK OFFICE
CERTIFICATE OF CORRECTION

PATENT NO. : 4,606,883  Page 1 of 2
DATED : August 19, 1986
INVENTOR(S) : Kurt Wizemann; Hans Weisskopf; & Peter Peppler It is certified that error appears in the above-identified patent and that said Letters Patent is hereby corrected as shown below:

Col. 1, line 33, cancel "0.5 mm," and insert --0.5 mm)--.

Col. 6, claim 10, line 35, cancel "1, characterized in that" and insert --2, wherein--.

Col. 6, claim 11, lines 41 & 42, cancel "claims 1 or 10, characterized in that" and insert --claim 1, wherein--;

line 43, cancel ",precompacted or sintered";

lines 43 & 44, cancel "or as an alloy";

lines 44 to 46, insert a period (.) after "components" and cancel "and then bonded with the base member over the entire surface by being hot-isostatically pressed.".

Col. 6, claim 12, lines 47 to 49, cancel "any or several of claims 1 to 11, characterized in that to control diffusion of the plating material and base material" and insert --claim 1, wherein--;

line 51, cancel "or cobalt";

line 51, before "base" insert --said--;

UNITED STATES PATENT AND TRADEMARK OFFICE
CERTIFICATE OF CORRECTION

PATENT NO. : 4,606,883     Page 2 of 2
DATED : August 19, 1986
INVENTOR(S) : Kurt Wizemann; Hans Weisskopf; & Peter Peppler It is certified that error appears in the above-identified patent and that said Letters Patent is hereby corrected as shown below:

line 51, before "plating" insert --said--;

line 52, after "material" and before the period (.), insert --to control diffusion of the base material and said plating material--.

Col. 6, claim 13, lines 53 & 54, cancel "any or several of the preceding claims, characterized in that" and insert --claim 1, wherein--.

Col. 6, claim 14, lines 57 & 58, cancel "characterized in that" and insert --wherein--.

Col. 6, claim 15, lines 61 & 62, cancel "any or several of the preceding claims, characterized in that" and insert --claim 1, wherein--.

Signed and Sealed this

Second Day of December, 1986

Attest:

DONALD J. QUIGG

*Attesting Officer*   *Commissioner of Patents and Trademarks*